(12) United States Patent
Grimaud

(10) Patent No.: US 9,509,671 B2
(45) Date of Patent: Nov. 29, 2016

(54) 3D BOT DETECTION

(71) Applicant: Dassault Systemes, Velizy Villacoublay (FR)

(72) Inventor: Jean-Jacques Grimaud, Winchester, MA (US)

(73) Assignee: Dassault Systèmes, Velizy Villacoublay (FR)

( * ) Notice: Subject to any disclaimer, the term of this patent is extended or adjusted under 35 U.S.C. 154(b) by 375 days.

(21) Appl. No.: 13/728,359

(22) Filed: Dec. 27, 2012

(65) Prior Publication Data
US 2014/0189798 A1 Jul. 3, 2014

(51) Int. Cl.
G06F 21/00 (2013.01)
H04L 29/06 (2006.01)
G06F 21/36 (2013.01)

(52) U.S. Cl.
CPC .............. *H04L 63/08* (2013.01); *G06F 21/36* (2013.01); *G06F 2221/2133* (2013.01)

(58) Field of Classification Search
None
See application file for complete search history.

(56) References Cited

U.S. PATENT DOCUMENTS

| | | | |
|---|---|---|---|
| 5,821,933 A | 10/1998 | Keller et al. | |
| 7,873,237 B2 | 1/2011 | Grimaud et al. | |
| 8,453,221 B2 | 5/2013 | Danielsen et al. | |
| 8,621,396 B1 | 12/2013 | Gossweiler, III | |
| 9,118,675 B2 | 8/2015 | Grimaud | |
| 2005/0065802 A1* | 3/2005 | Rui et al. | 705/1 |
| 2008/0216163 A1* | 9/2008 | Pratte et al. | 726/7 |
| 2009/0187986 A1* | 7/2009 | Ozeki | 726/21 |
| 2010/0169958 A1 | 7/2010 | Werner et al. | |
| 2010/0238810 A1 | 9/2010 | Ormazabal | |
| 2010/0277272 A1 | 11/2010 | Yang | |
| 2011/0154482 A1 | 6/2011 | Heiner et al. | |
| 2011/0292031 A1* | 12/2011 | Zhu et al. | 345/419 |
| 2012/0272302 A1* | 10/2012 | Zhu et al. | 726/6 |
| 2012/0278626 A1 | 11/2012 | Smith et al. | |
| 2012/0278879 A1 | 11/2012 | Ganem | |

(Continued)

FOREIGN PATENT DOCUMENTS

EP 2 466 518 A1 6/2012

OTHER PUBLICATIONS

European Search Report from EP 13199183, titled "3D Bot Detection", dated May 9, 2014.

(Continued)

*Primary Examiner* — Jeffery Williams
(74) *Attorney, Agent, or Firm* — Hamilton, Brook, Smith & Reynolds, P.C.

(57) ABSTRACT

In one embodiment, a computer method of verifying an operator is human includes automatically selecting a pattern and dividing the pattern into a plurality of textures. The method further includes projecting each texture onto a different respective displayed element in a 3D experience. The method additionally includes randomizing a position and/or an orientation of at least one displayed element of the different respective display elements in the 3D experience. The method also includes receiving operator manipulations of the randomized elements to solve for the pattern and make the pattern appear/reappear. The method further includes granting access to the operator if the pattern is made to appear/reappear. Access is granted upon determining that the operator has made the pattern is appear/reappear, and access is denied if the operator fails to make the pattern appear/reappear.

23 Claims, 10 Drawing Sheets

(56) References Cited

U.S. PATENT DOCUMENTS

2012/0323700 A1* 12/2012 Aleksandrovich
 et al. .......................... 705/14.69
2014/0189819 A1 7/2014 Grimaud

OTHER PUBLICATIONS

Guo, M.H., et al., "Authentication Using Graphical Password in Cloud," *15th International Symposium on, IEEE*, pp. 177-181 (2012).

European Search Report for European Application No. EP 13 19 9195, dated Mar. 18, 2014, consisting of 7 pages.
Alsulaiman FA et al., "A Novel 3D Graphical Password Schema," VECIMES 2006—IEEE International Conference on Virtual Environments, Human-Computer Interface, and Measurement Systems, La Coruña, Spain, Jul. 2006, pp. 10-12.
Saddik AE, "3D Password," Oct. 25, 2007, Web Jan. 15, 2013, retrieved from www.youtube.com/watch?v=4bvMolNiyX0.
Pawar, et al., "3-D Graphical Password Used for Authentication" Int. Journal of Computer Technology & Applications, vol. 3(2), Feb. 2008.

* cited by examiner

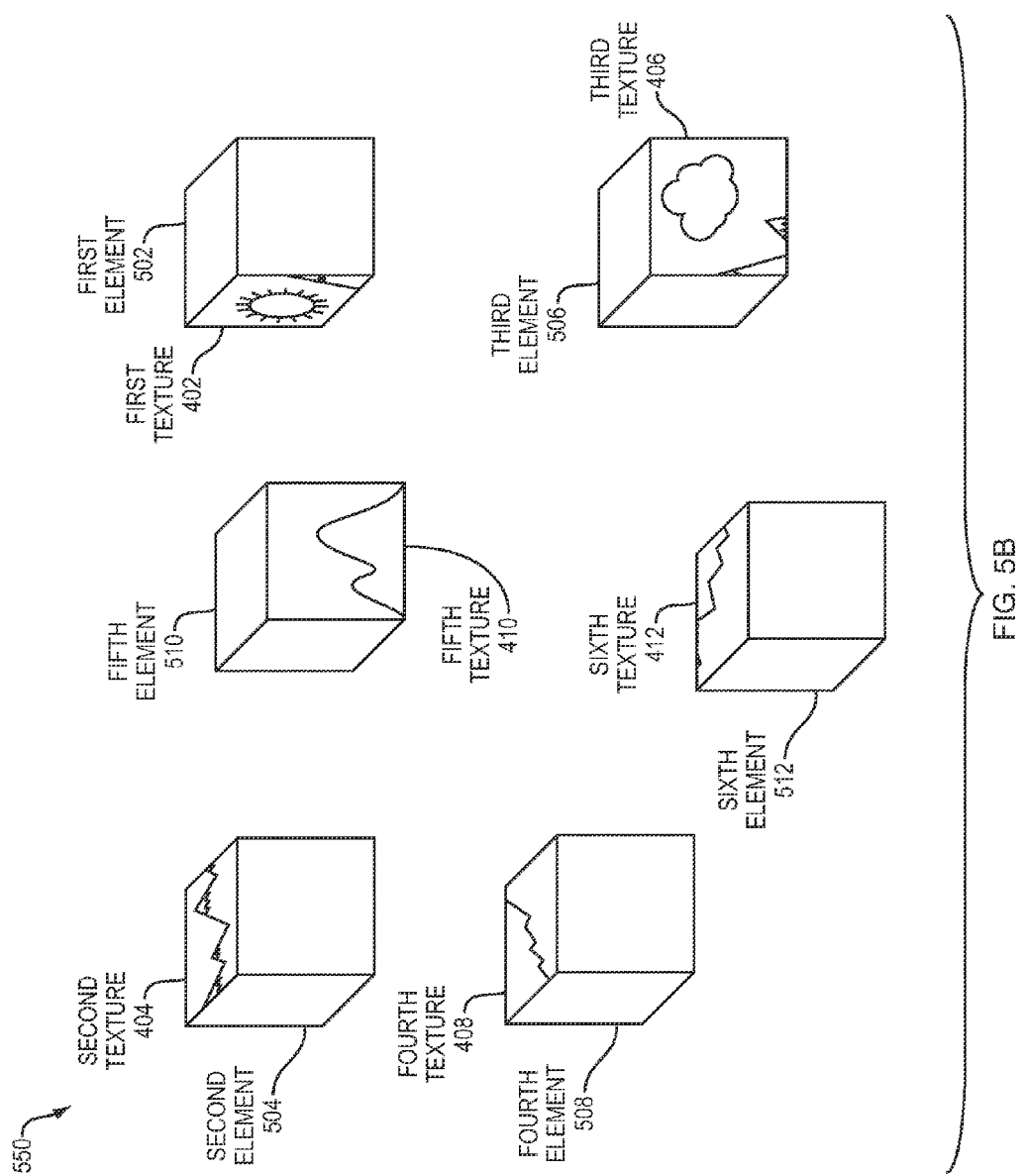

3D BOT DETECTION

BACKGROUND OF THE INVENTION

A system (such as a website) can allow or deny access through Robot Exclusion Protocol (REP). A system employing REP utilizes a text file, accessible to other systems that connect over the Internet, that instructs robots accessing the text file not to access the website. After reading the file, the robot does not access the system/website, assuming the robot is compliant with REP.

However, not all robots comply with REP. For those non-compliant robots, detection by websites typically relies on Completely Automated Public Turing test to Tell Computers and Humans Apart (CAPTCHA). A CAPTCHA uses an image which contains a disjointed and/or distorted alpha-numerical sequence. The system prompts a user to recognize the alphanumerical sequence and to input it using the user's keyboard.

For many years, a robot could not employ alphanumerical recognition/Optical Character Recognition (OCR) technology to recognize the alphanumerical sequence in the CAPTCHA successfully. Now, a robot can employ OCR technology to recognize alphanumeric sequences in images provided by CAPTCHA. For example, the CAPTCHA of Windows Live™ can be cracked in under one minute. As OCR technologies advance, the CAPTCHA approach to discriminate between a human user and a robot becomes less effective.

A sensitive website, such as a bank website, can receive from 10,000-100,000 attacks per hour from robots. Early determination of whether an access attempt is from a human user versus a robot is necessary to enable the human user to access the website and to block a robot. Such a discrimination can diminish non-human and potentially harmful requests.

Another difficulty is distinguishing a human user from a robot using a test that a human user can successfully and consistently pass in a limited amount of time.

SUMMARY OF THE INVENTION

Alternatives to CAPTCHA include non-linguistic visual tests, audio tests, and semantic or logistic puzzles. These alternatives do not have a worldwide scope because they either are culturally dependent or have limited test diversity to offer a larger-scale general solution.

CAPTCHA can be overcome by brute force analysis and/or through advanced software means, such as OCR.

The proposed system displays through a computer monitor 3-Dimensional (3D) objects to the user, the 3D objects as displayed needing to be manipulated by the mouse, keyboard or other input devices to achieve a specific required result. Upon the user, through input/output (I/O) manipulations, reaching the specific required result, the system grants the user access. This method prevents robots from accessing a website and crawling the website, and thereafter creating some malfeasance. The system and method also distinguishes between a human user and a robot using a test that the human user can successfully pass in a limited amount of time.

In one embodiment, a computer implemented method of verifying an operator is human includes automatically (via a computer process) selecting a pattern and dividing the pattern into a plurality of textures. The method further includes projecting each texture onto a different respective 3D element displayable on a computer monitor/display device. The method additionally includes randomizing a position and/or an orientation of at least one element of the different respective 3D elements. The method additionally includes displaying to a current operator user, at a display device, at least a portion of the 3D elements including the at least one randomized 3D element. The method also includes receiving operator user manipulations of the randomized 3D elements to recreate or reconstruct the pattern (by solving or otherwise undoing the randomization). The method further includes making a determination that the operator user is human if the pattern is recreated/reconstructed.

In another embodiment, the method further includes granting access to the operator user if the pattern is recreated (e.g., the determination of the operator user being human is in the positive). Access is granted upon determining that the pattern is recreated, and access is denied if the pattern is not recreated.

In one embodiment, selecting a pattern includes selecting a multimedia representation, the multimedia representation being a picture, shapes, lines, audio, video, animation, characters, and/or symbols.

Projecting each texture onto the respective display elements in a 3D experience can include projecting each texture onto a respective element. Each respective element can include a 3D shape. The 3D shape may be a cube, a sphere, pyramid, box, and/or other 3D shape.

In one embodiment, receiving operator manipulations can include manipulations of the displayed 3D objects such that the 3D objects are located in a particular arrangement within the 3D experience. Receiving operator manipulations can further include manipulations of the computer displayed 3D objects in the particular arrangement such that the pattern becomes displayed (is reconstructed and made to appear) on a collective common face of the particular arrangement.

In one embodiment, projecting each texture onto the respective display element in the 3D experience further can include remotely rendering the 3D experience. The method can also include transferring pixels of the remotely rendered 3D experience to a remote machine, for example, a machine of the user.

In another embodiment, receiving, from the operator, manipulations of the randomized elements can include receiving input from a keyboard, mouse, and/or other input device.

In yet a further embodiment, receiving, from the operator, manipulations of the randomized elements can include receiving rotation commands from the operator to rotate the element along at least one particular axis and by a particular degree. Receiving, from the operator, manipulations of the randomized elements can include receiving translation commands from the operator to translate the element in at least one particular direction.

In one embodiment, a computer implemented system for verifying an operator is human includes a pattern selection module configured to automatically select a pattern and a pattern division module configured to divide the pattern into a plurality of textures. The system also includes a projection module configured to project each texture onto a different respective 3D element displayable on a computer display device. The system further includes a randomization module configured to randomize a position and an orientation of at least one 3D element of the 3D elements. The system also includes a display device configured to display at least a portion of the 3D elements including at least one randomized 3D element. The system also includes a manipulation module configured to allow the operator to manipulate the randomized 3D elements to recreate/reconstruct the pattern (by effectively undoing the randomizing). The system also includes an access module configured to grant access to the operator if the pattern is recreated/reconstructed. The access module grants access upon determining that the pattern is recreated/reconstructed (signifying/signaling that the operator is human), and denies access if the pattern is not recreated (signifying/signaling that the operator is nonhuman).

In another embodiment, a non-transitory computer-readable medium can be configured to store instructions for verifying an operator is human. The instructions, when loaded and executed by a processor, can cause the processor to automatically select a pattern and divide the pattern into a plurality of textures. The instructions can further cause the processor to project each texture onto a different respective 3D element displayable on a computer display device. The instructions additionally can cause the processor to randomize a position and an orientation of at least one element of the different respective 3D elements. The method additionally includes displaying, at a display device, at least a portion of the 3D elements including the at least one randomized 3D element. The instructions can also cause the processor to allow the operator to manipulate the randomized 3D elements to reconstruct, or arrive at, the pattern. The instructions can further cause the processor to grant access to the operator if the pattern is reconstructed (signifying that the operator is determined to be human).

In yet another embodiment, a computer implemented method of verifying an operator is human can include automatically (via a computer processor) selecting a pattern. The method can further include dividing the pattern into a plurality of textures. The method can additionally include projecting each texture onto a different respective element in a user interactive session displaying one or more 3D objects formed by the elements. The method can also include randomizing at least one of a position, serial order location and an orientation of at least one element of the different respective elements in the displayed one or more 3D objects of the user interface session. The method may also include displaying, at a display device, at least a portion of the 3D objects including the at least one randomized 3D objects. The method may also include receiving, from the operator, manipulations of the randomized elements to recreate by reconstruction (arrive at) the pattern as the displayed one or more 3D objects. The method may further include granting access to the operator upon the received operator manipulations causing the pattern to appear by the displayed 3D objects in the user interface session.

The displayed 3D object may include a 3D shape and the elements may be respective faces of the 3D shape. Projecting each texture onto the respective elements in the displayed 3D object of the user interface session can include projecting each texture onto the corresponding respective face for the 3D shape of the displayed 3D object.

The 3D shape can be one of a cube, a sphere, pyramid, box, and/or other 3D shape.

In one embodiment, receiving, from the operator, manipulations can include manipulations from the operator of elements from the displayed 3D objects to be located in a particular arrangement. Reconstructing to cause the pattern to appear can further include manipulating the 3D objects in the particular arrangement to display the pattern on a collective common face of the particular arrangement.

In one embodiment, projecting each texture onto a respective element in the displayed 3D object over the user interface session further can include remotely rendering a current state of the displayed 3D object. The method can also include transferring pixels of the current state of the remotely rendered 3D object to a remote machine (e.g., the machine of the user).

In one embodiment, a 3D experience is a user interface session that includes a 3D model or a representation of a 3D model to the user, presentation of audio, video, paint box, and/or animation. In addition, the 3D experience can combine the presentations of any of the 3D model, representation of the 3D model, audio, video, paint box, and/or animation. For example, the 3D experience may present a video, paint box, or animation as a dynamic face of a shape in the 3D model. The 3D experience could also add audio to the video, animation, paint box or 3D model. The 3D experience can provide the user with controls to manipulate the 3D model. Such manipulations can include translation, relative location, rotation, and object/element editing. The 3D model may include multiple objects and/or elements for the user to manipulate. The 3D experience provides the ability for a user to experience a virtual (e.g., digital) environment through his or her senses and interact with this virtual environment to achieve objectives of a human activity. The virtual environment may resemble real or imaginary environments.

If the 3D experience is a representation of the 3D model, then the computer system loads and displays representations of the 3D model, which is stored on a server, without loading the 3D model itself. For example, rendered images or images with lower quality are transferred from the server to the system presenting the 3D experience. This prevents an automated process from downloading the 3D model itself and manipulating it with a script or program, by, for example, trapping the calls from the 3D model representation within the local memory to the graphic card and enabling the reconstitution of the 3D model outside the authorized application.

In one embodiment, a 3D element can be a 3D object. In this embodiment, the 3D element may include faces or surfaces, each face or surface showing a pattern, texture, alphanumeric character, etc. In another embodiment a 3D object can be a 3D object, such as a cube or other shape, and a 3D element refers to a face or surface on the 3D object. Both of these embodiments may perform the same features, but use different nomenclature in their respective descriptions.

If the 3D experience is a representation of the current state of the 3D model, then the computer system loads and displays representations of the current state of the 3D model, which is stored on a server, without loading the 3D model itself. For example, rendered images or images with lower quality are transferred from the server to the system presenting the 3D experience. This prevents an automated process from downloading the 3D model itself and manipulating it with a script or program.

In one embodiment, a 3D element can be a 3D object. In this embodiment, the 3D element may include faces or surfaces, each face or surface showing a pattern, texture, alphanumeric character, etc. In another embodiment a 3D object can be a computer displayed representation of a real world 3D object, such as a cube or other shape, and a 3D element refers to a face or surface on the represented real world 3D object. Both of these embodiments may perform the same features, but use different nomenclature in their respective descriptions.

In other embodiments, the method can instruct a display device or display module to display at least a portion of the 3D elements including the at least one randomized 3D element. In another embodiment, the method can receive operator manipulations from a computer input device or user input device. In another embodiment, the method is performed by a server, which instructs a display at a remote device via a network to display at least a portion of the 3D elements including the at least one randomized 3D element and then receives operator manipulations of the randomized 3D elements to recreate the pattern over the network.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 5B is a diagram illustrating an example embodiment of a plurality of elements after being randomized by the system.

DETAILED DESCRIPTION OF THE INVENTION

A description of example embodiments of the invention follows.

In one embodiment, the proposed system uses 3-Dimensional (3D) objects displayed in a computer generated 3D environment which need to be manipulated by the mouse, keyboard, or other input devices to achieve an objective (e.g., a specific required result).

In one embodiment, a user is instructed to complete an objective. The objective can be manipulating a computer displayed simple cube in a particular order.

In another embodiment, the objective is manipulating, via computer display, several cubes and assembling the cubes to create a 3D composition of an image such as straight lines on a common face of the assembled cubes.

For example, three cubes provide 13,824 possible combination of orientations individually and three times more as a straight assembly (in series or composite). Similarly, four cubes provide 331,776 possible combinations of orientations individually, 12 times more as a straight assembly and even more if you include non-linear assemblies, creating approximately 4,000,000 combinations.

The level of difficulty can be adjusted so that intelligence (e.g., measured by IQ) required to complete the objective is no more than one of a child. A four or five year old child is capable of arranging a set of six cubes organized in two rows of three to form an image in less than a minute, a task that sorts through approximately a billion combinations, if the child is helped by colors and image styles.

Colors quickly facilitate the answer for a human user. They may be described semantically (e.g., strawberry or raspberry). Stylized representations of objects or animals using a semantic approach can also facilitate recognition by human users that is difficult for robots. Similarly, the use of geometric representations (e.g., circles, lines) with positions and orientations requires a level of logic currently difficult for robots.

The time given to the user and to the robot to solve the problem can be similar to the one acceptable for similar devices. For example, SecureID, used by many security systems, changes its value every 60 seconds. The 3D manipulation should be able to be solved by a human in less than 60 seconds to be acceptable, and provide only limited repeated attempts to prevent a robot from solving the manipulation with brute force.

This can be applied to many different systems, including remote rendering server systems where the rendering is done on the server and provides pixel-based and/or frame-based images to the client.

The 3D objects can be associated with alphanumerical characters, other characters, or colors/symbols.

The proposed starting position and orientation of the 3D objects can be randomized, so that input of the keyboard, mouse, or other input devices collected by a spying device cannot be used again to solve the objective.

Figure 1:
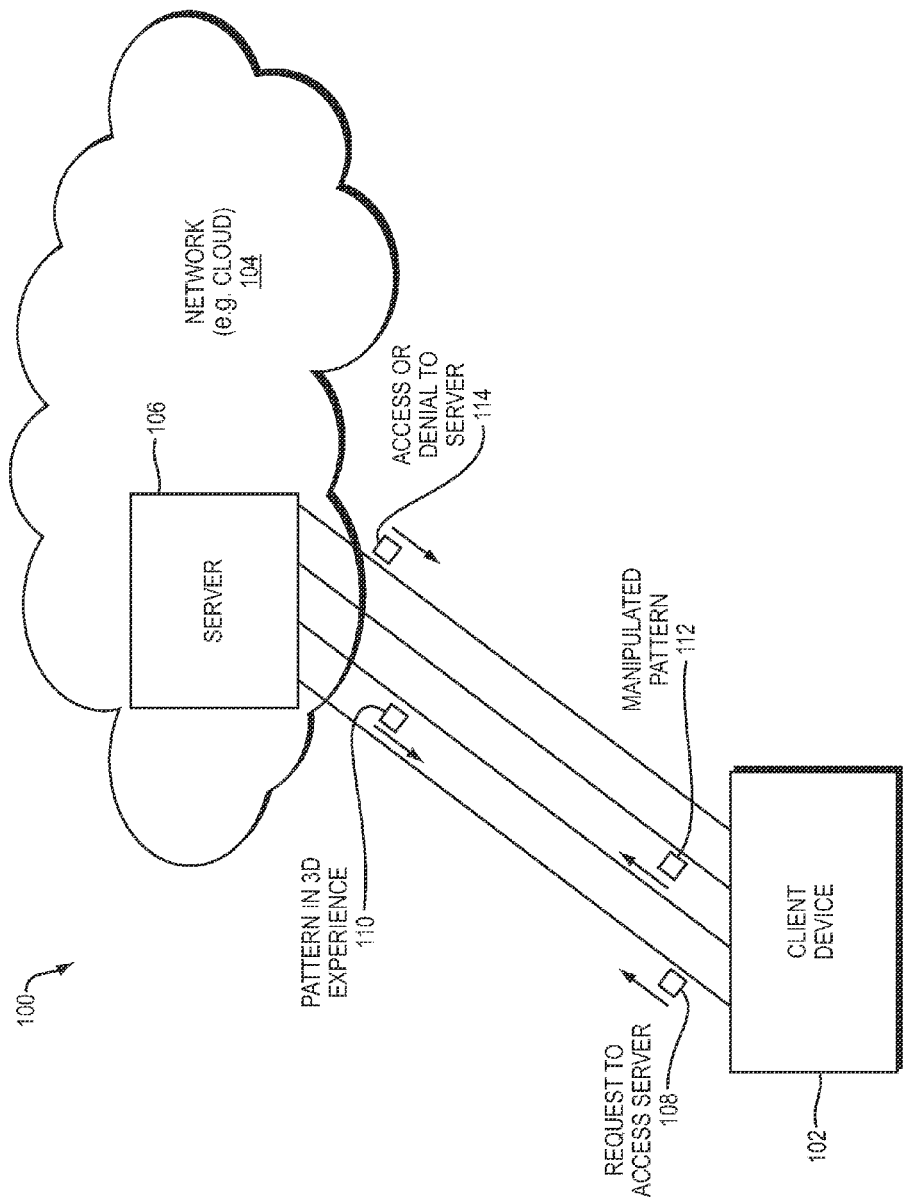
FIG. 1 is a block diagram illustrating an example embodiment of 3D bot detection.

FIG. 1 is a block diagram 100 illustrating an example embodiment of 3D bot detection. As an example system includes a client device 102 coupled with a server 106 over a network 104 (e.g., the cloud or the Internet). The server 106 is configured to offer a cloud-based service to a client device 102. The cloud-based service offered by the server 106 can be resource intensive. For example, the cloud-based application can utilize a lot of bandwidth or processing power. For this reason, many servers 106 attempt to limit the access to the cloud-based applications to actual human operators of client devices 102 as opposed to robots. The server 106 should not waste resources on a robot or automated script attempting to connect to it. For this reason, the server 106 can employ bot detection. The applicant's method of bot detection employs 3D experiences to better screen bots and/or automated scripts from connecting to the server 106, while still allowing human users to verify that they are not a bot and connect to the server.

The client device 102 issues a request 108 to access the server 106. Server 106, upon receiving the request 108, issues a pattern 110 in the format of a 3D experience. The client device 102 receives the pattern 110 and displays it to the client user. The pattern 110 is a pattern, such as an image, which is broken up and projected onto multiple elements of a 3D experience. The elements are then randomized, by randomizing position (e.g., serial location) and orientation (e.g., rotation) and shown to the client user in this randomized fashion. The client user, via computer I/O, then manipulates the 3D experience and elements therein to create a manipulated pattern 112 which is sent to the server 106.

Upon receiving the manipulated pattern 112, the server 106 makes a determination of human or non-human user, and allows or denies server access based on this determination. The server 106 issues access to the server or denial 114.

Figure 2:
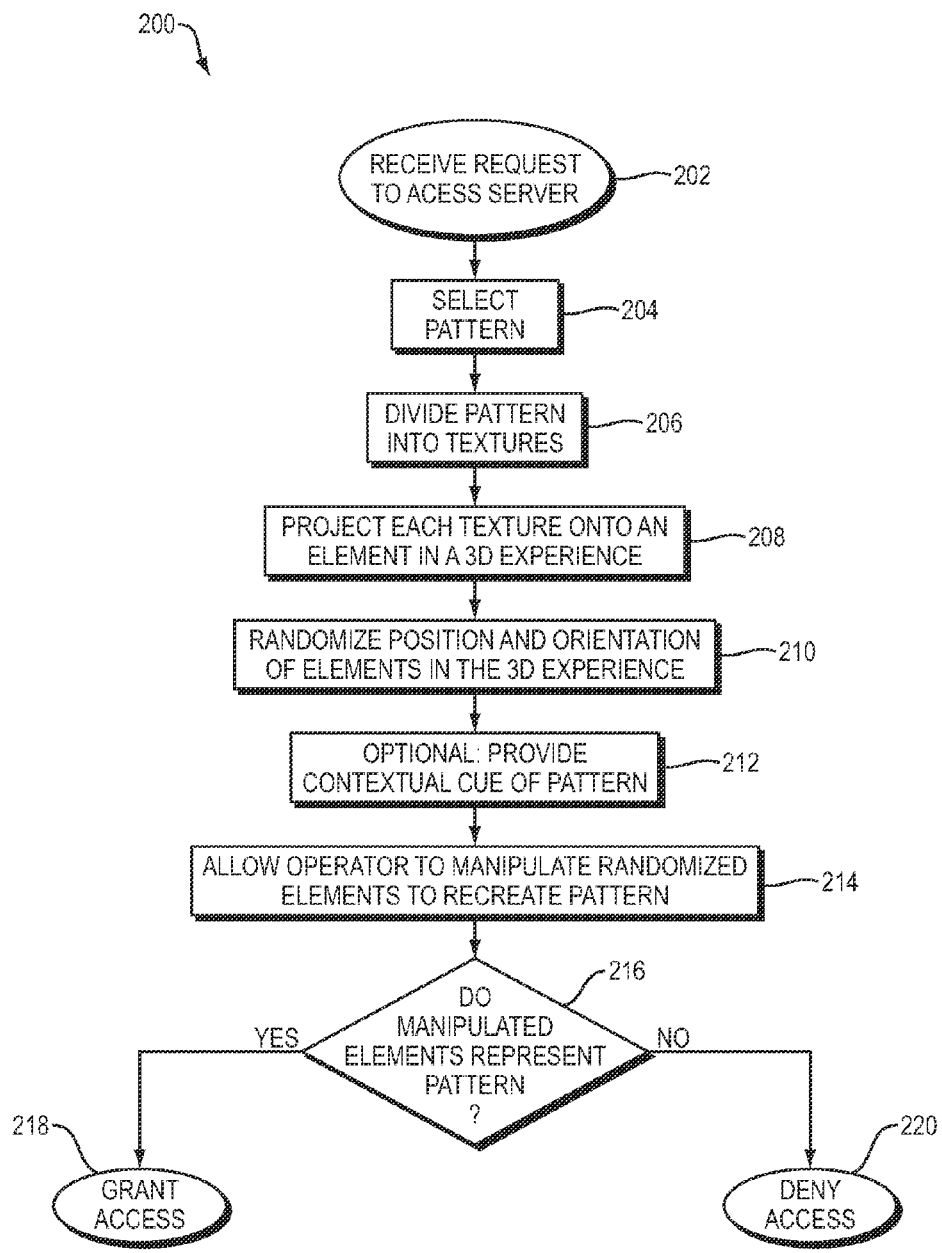
FIG. 2 is a flow diagram illustrating an example embodiment of a method employed by the present system.

FIG. 2 is a flow diagram 200 illustrating an example embodiment of a method employed by the present invention system. The system first receives a request to access the server (202). In response to the request, the system automatically selects a pattern (204) and divides the pattern into textures (206). The system then projects each texture onto an element within a computer generated 3D experience (208). For example, each texture, derived from the pattern, can be projected onto a face of a cube or onto other object(s) displayable in the 3D experience. After the projection of textures onto the elements, the system randomizes the position, serial order location and orientation of elements as displayed in the 3D experience (210). For example, the cubes can be randomized by location and rotation so that the pattern is not easily derived by a robot and re-constructed by the robot, but could be derived and re-constructed by a person. The randomization also prevents malicious keystroke and input malware applications, which can record and replay the captured events, to gain access.

Optionally, the system can provide a contextual cue or hint of the pattern (212). For example, if the pattern were of a landscape, the cube could be a landscape. The cube could also be a picture of the final pattern. The cube, even if it is a picture, is not enough to trigger access to the server because the server analyzes the user input manipulations of the 3D experience to determine access or denial not simply the final result. Then, the system allows the operator to manipulate the randomized elements to re-create/reconstruct the pattern (214).

Then, the system determines whether the manipulated elements represent the pattern (216). If so, the system grants access to the server (218). If not, the system denies access to the server (220).

Figure 3:
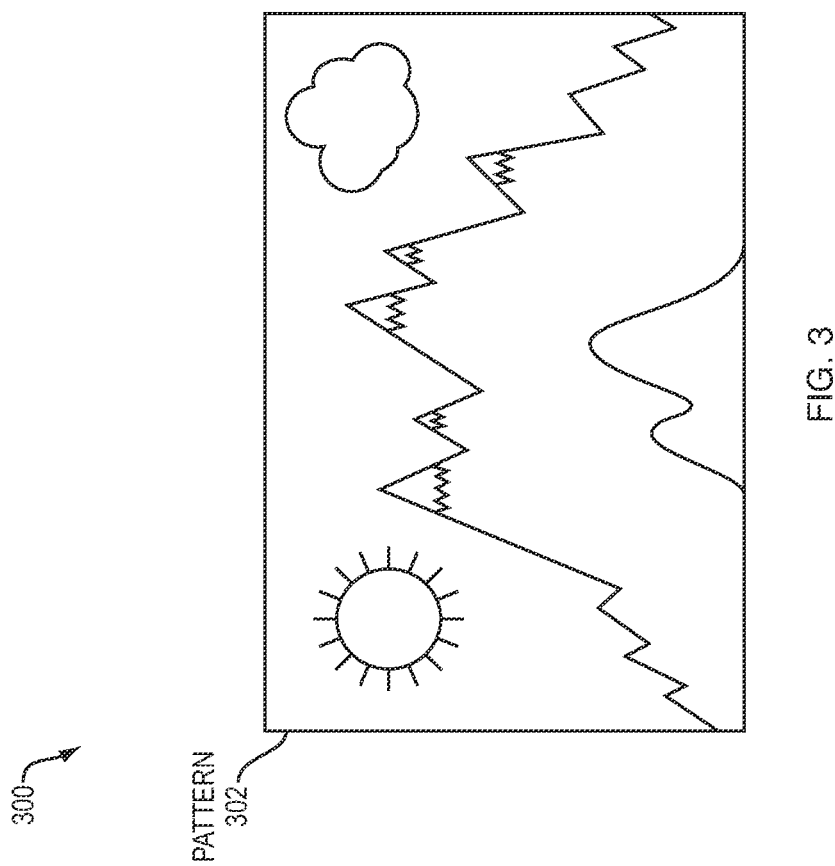
FIG. 3 is a diagram illustrating an example embodiment of a pattern employed by the present system.

FIG. 3 is a diagram 300 illustrating an example embodiment of a pattern 302 employed by the present system. The pattern 302, in this instance, is an image. However, the pattern 302 can be any multimedia presentation. For example, the pattern 302 can be a video, animation, 3D texture, or other type of pattern.

Figure 4:
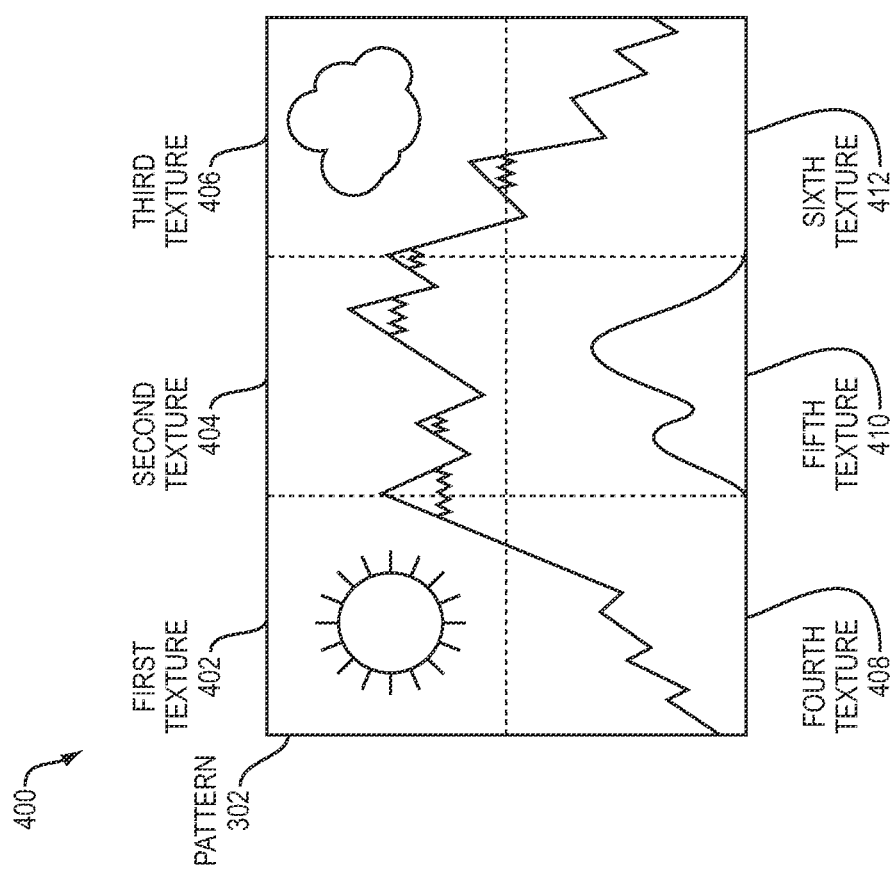
FIG. 4 is a block diagram illustrating an example embodiment of a pattern divided into a plurality of textures.

FIG. 4 is a block diagram 400 illustrating the pattern 302 divided into a plurality of textures 402, 404, 406, 408, 410, and 412. The first texture 402, second texture 404, third texture 406, fourth texture 408, fifth texture 410 and sixth texture 412 are non-overlapping regions of the pattern 302. The plurality of textures 402, 404, 406, 408, 410 and 412 can be separated and projected onto different elements displayable in a computer 3D experience in the present system.

Figure 5A:
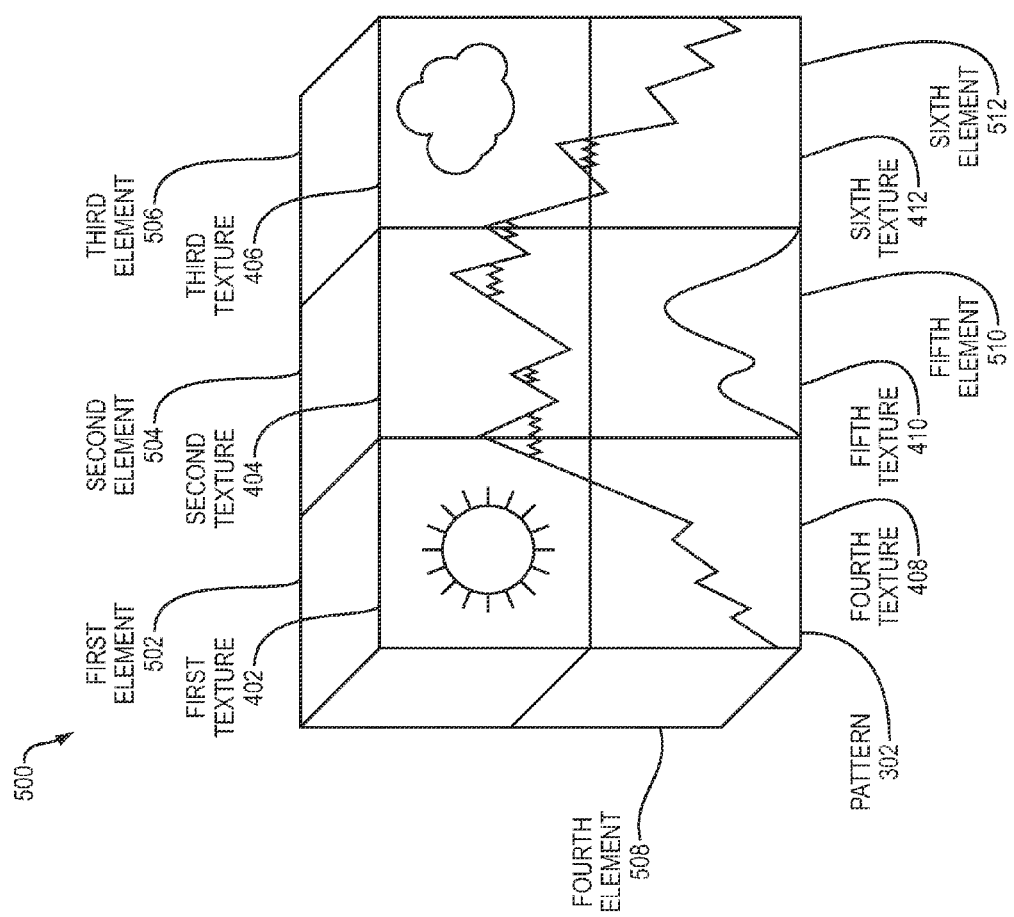
FIG. 5A is a diagram illustrating an example embodiment of a plurality of elements with textures projected onto their faces collectively representing a pattern.

FIG. 5A is a diagram 500 illustrating a plurality of elements with textures projected onto their faces representing a pattern 302. After the pattern 302 is divided into first texture 402, second texture 404, third texture 406, fourth texture 408, fifth texture 510, and sixth texture 412, each respective texture is projected onto first element 502, second element 504, third element 506, fourth element 508, fifth element 510, and sixth element 512. Each respective texture is on a face of each respective element. The arrangement of the elements 502, 504, 506, 508, 510 and 512, are such that the pattern is visible through the display of the respective textures 402, 404, 406, 408, 410 and 412.

FIG. 5B is a diagram 550 illustrating the plurality of elements after being randomized by the system. As shown in FIG. 5B, each element is broken away from the original configuration shown in FIG. 5A where the faces of each element are flush against one another, and the orientations have also been randomized. The first element 502 still displays the first texture 402. Likewise, the second element 504 displays the second texture 404, the third element 506 displays the third texture 406, the fourth element 508 displays the fourth texture 408, the fifth element 510 displays fifth texture 410, and the sixth element 512 displays the sixth texture 412. All the textures are projected on their respective element, however, each element and texture is in a location and orientation different from its perspective original location and orientation. In one embodiment, the system is configured to randomly position and rotate each element such that the texture of the pattern is visible to the user. In this manner, the texture on each element is not hidden from the user by being moved or rotated away from the screen. However, in another embodiment, the textures can be rotated or moved so that the user can not initially see them, but only see them upon translating or rotating the particular element to add difficulty to the test.

Figure 6:
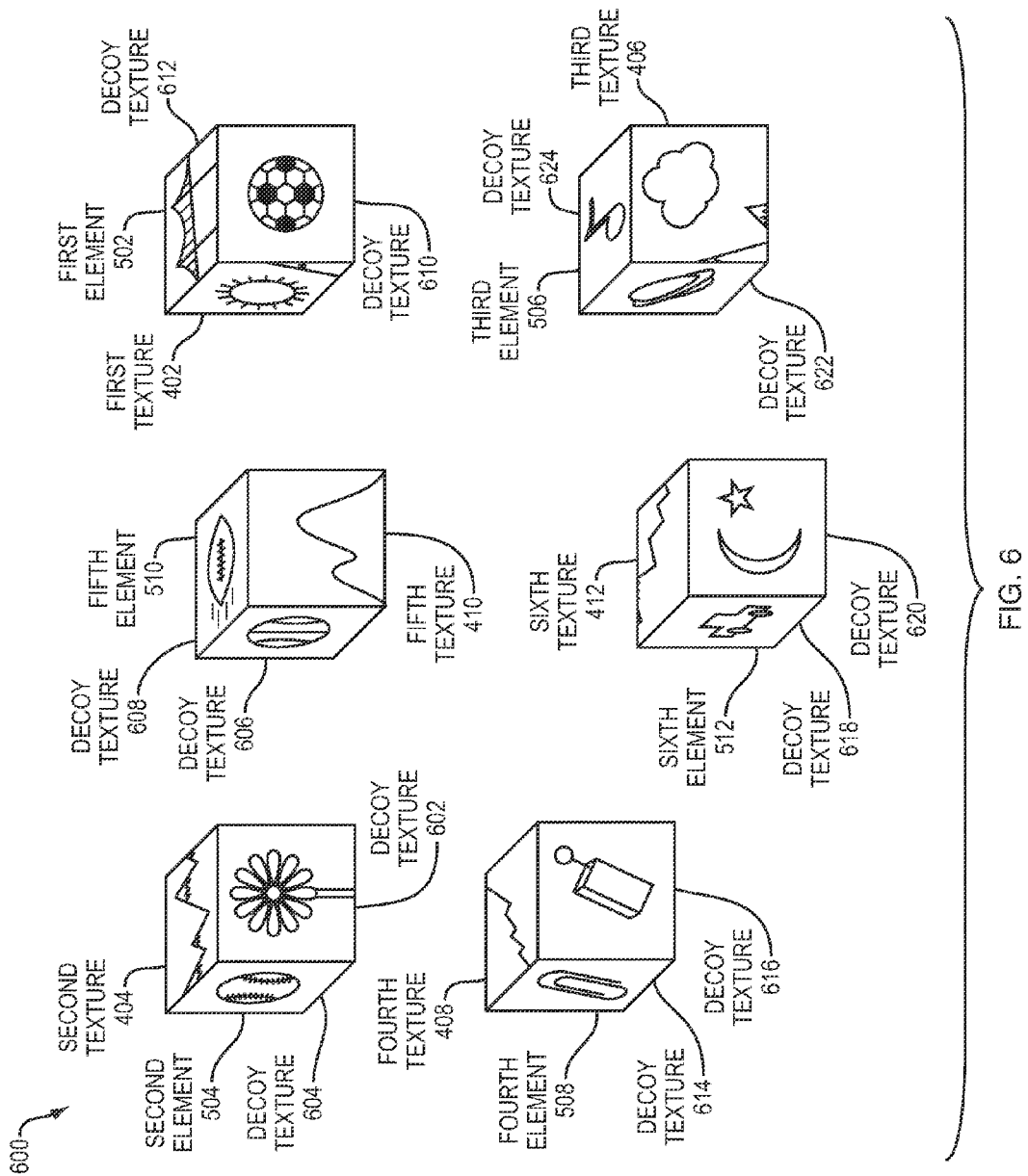
FIG. 6 is a block diagram illustrating an example embodiment of the plurality of elements showing additional decoy textures on their respective faces.

FIG. 6 is a block diagram 600 illustrating an example embodiment of the plurality of elements showing additional decoy textures on their respective faces. Each element displays the texture of the pattern as the originally rendered elements. However, the elements can include decoy textures on its unused faces to increase difficulty for robots to solve the test. For example, a first element 502 has the first texture 402 projected on one of its faces, but also has a decoy texture 610 of a soccer ball and a decoy texture 612 of a suspension bridge projected on respective unused faces of the first element 502. Similarly, second element 504 has the second texture 404 projected on one of its faces, but also has decoy texture 604 showing a baseball, and decoy texture 602 showing a flower projected on respective unused faces. The third element 506 has the third texture 406 projected onto one of its faces, and also decoy texture 622, showing a planet, and decoy texture 624, showing a musical note, projected on respective unused faces. Fourth element 508 has fourth texture 408 projected onto one of its faces, and in addition includes decoy texture 614, showing a paperclip, and decoy texture 616, showing a mobile electronic device, projected on respective unused visible faces. The fifth element 510 has the fifth texture 410 projected onto one of its faces, but also has the decoy texture 606, showing a basketball, and decoy texture 608, showing an American football, projected on respective unused faces. Sixth element 512 has sixth texture 412 projected onto one of its faces, and also decoy texture 618, showing a car, and decoy texture 620, showing a moon and a star projected on it respective unused faces.

In certain embodiments, it may be easier for an automated system to determine that faces of an element are blank rather than having a texture. Projecting decoy textures on unused faces of the elements can increase the effectiveness of deterring bots, without hampering a human user's effort to solve a puzzle and gain access to the server. Other decoy elements can be on the three faces of the cubes not shown on the elements in FIG. 6. Elements can be shapes other than cubes, having any number of faces visible to the user and hidden from the user based on their geometry.

Figure 7:
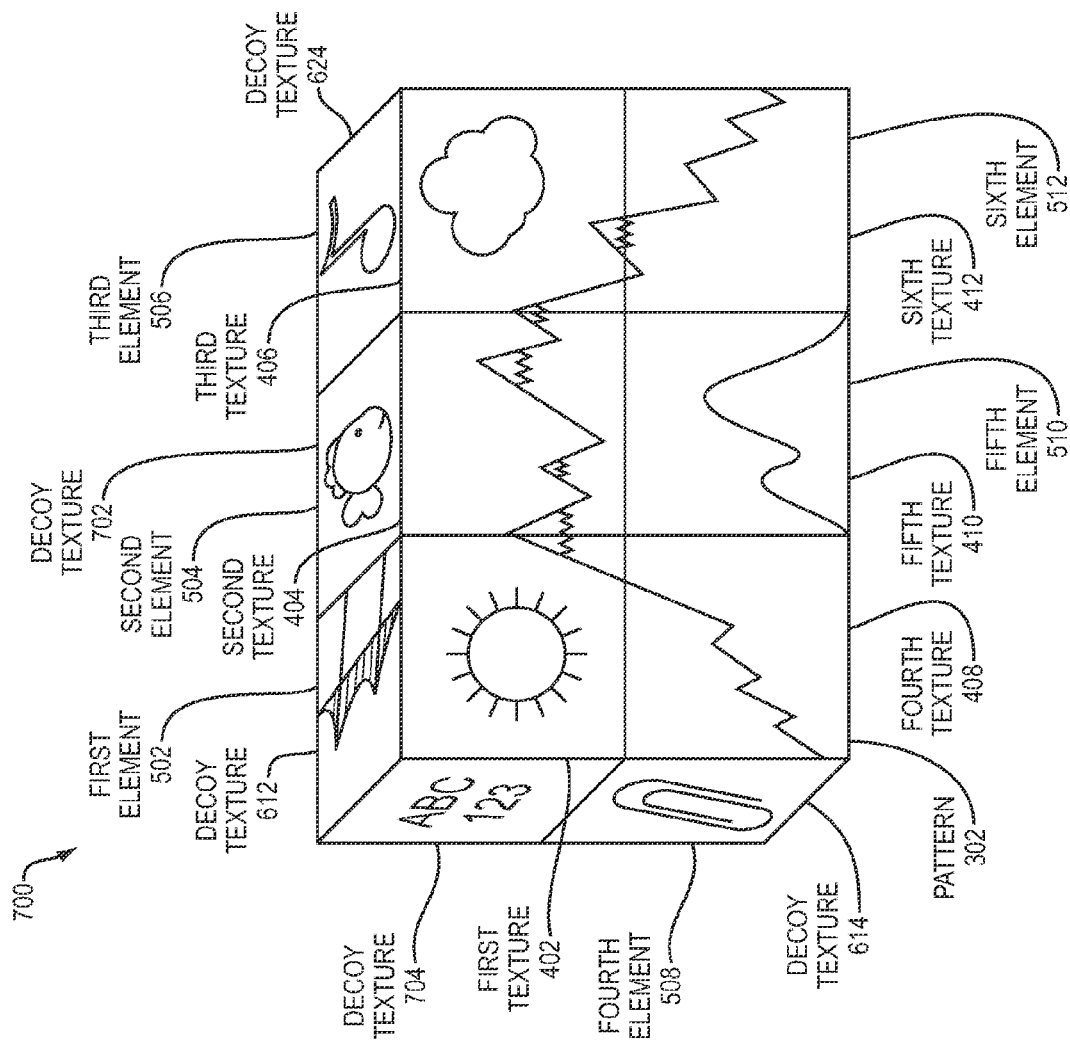
FIG. 7 is a block diagram illustrating an example embodiment of a reconstructed pattern from the first element, second element, third element, fourth element, fifth element and sixth element.

FIG. 7 is a block diagram 700 showing a reconstructed pattern 302 from the first element 502, second element 504, third element 506, fourth element 508, fifth element 510 and sixth element 512. The first element 502 shows the first texture 402 on its front face, decoy texture 612 and a decoy texture 704, which is on a face of the first element 502 originally hidden from the user. Similarly, second element 504 shows the second texture 404 on its front face and a decoy texture 702, on a face of the second element 504 originally hidden from the user. The third element 506 shows the third texture 406 on its front face and also the decoy texture 624. The fourth element 508 shows the fourth texture 408 on its front face and the decoy texture 614. The fifth element 510 shows the fifth texture 410 on its front face. The sixth texture shows the sixth element 512 on its front face. In this manner, the six respective elements show the six respective textures in the same order and orientation of the pattern projected onto the elements originally. Once the user manipulates the elements to reach this state, the server can grant access to the user.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention can be used in any field that requires secure access to online material. It discriminates between digital robots and human users in order to cut off access to robots and facilitate normal user traffic.

Figure 8:
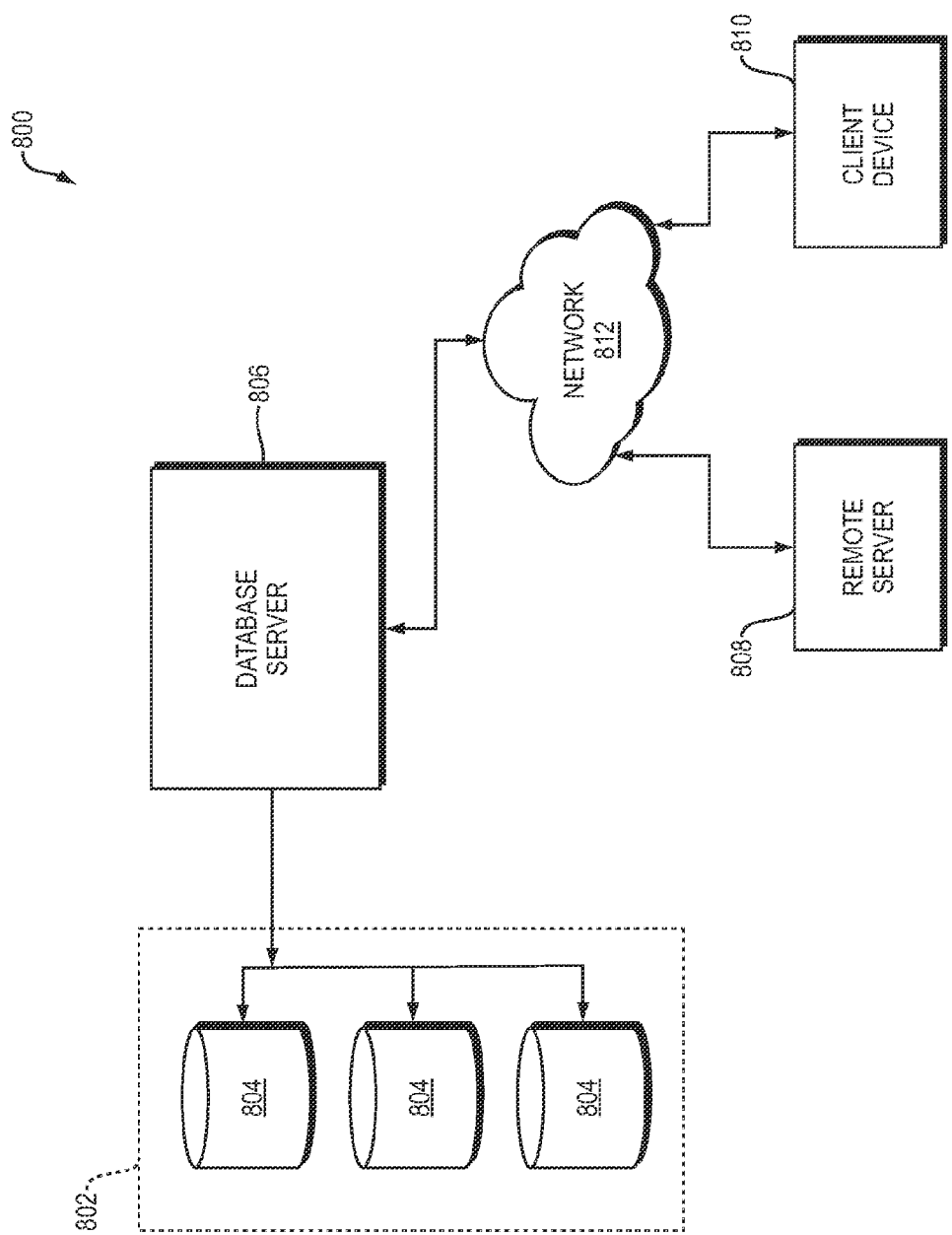
FIG. 8 is a schematic block diagram of an exemplary computer system for use in providing security in a relational database and for use in performing the processes described herein and/or additional processes that may be related to those described herein.

FIG. 8 is a schematic block diagram of an exemplary computer system 800 for use in providing security in a relational database and for use in performing the processes described above and/or additional processes that may be related to those described above. In an exemplary embodiment, a memory area 802 includes one or more storage devices 804 for use in storing data, such as metadata, database objects, relationships between database objects, ownership vector objects, security indices, or any suitable information or data. In some embodiments, the memory area 802 is coupled to a first application server, such as a database server 806, which is in turn coupled to one or more second application servers, such as remote server 808, which may be a full-text search server, and one or more client systems or devices 810, such as an administrator system and/or a user system, via a network 812. The storage devices 804 may be embodied as one or more databases, may be located at a single or at multiple geographical sites, or may be integrated with the database server 806. Moreover, the servers 806 and 808 may be located at a single or at multiple graphical sites. In single-site embodiments, the servers 806 and 808 may be integrated into a single device using multiple application servers or logic, such that server 806 is a database application and server 808 is a full-text search application.

As can be appreciated, the network 812 can be a public network, such as the Internet, or a private network such as an LAN or WAN network, or any combination thereof and can also include PSTN or ISDN sub-networks. The network 812 can also be wired, such as an Ethernet network, or can be wireless such as a cellular network including EDGE, 3G, and 4G wireless cellular systems. The wireless network can also be WiFi, Bluetooth, or any other wireless form of communication that is known. Thus, the network 812 is merely exemplary and in no way limits the scope of the present advancements.

As one of ordinary skill in the art would recognize, the database server 806, the remote server 808, and the client systems 810 can be any suitable computer system such as the one described below with reference to FIG. 9, or any other computing system that is known. Moreover, it should be understood that the database server 806 is configured to perform the processes described above and/or any additional processes that may be related to those described above.

The database server 806 stores the non-transitory, computer-readable instructions to execute the processes described above, and provides these instructions via the network 812 to the remote server 808 and/or the client systems 810. Moreover, the database server 806 can also provide data from the memory area 802 as needed to the remote server 808 and/or the client systems 810. As such, FIG. 8 includes implementations of the computer system 800 via cloud computing, distributed computing, and the like.

During operation, the computer system 800 performs the steps shown in FIGS. 1 and 2, both described above. For example, and with reference to FIG. 1, the database server 806 creates an ownership vector for each unique combination of security attributes in the relational database of memory area 802. The database server 806 then assigns an ownership vector, such as a first ownership vector, to each object based on one or more of the object's security attributes or properties. The database server 806 then publishes or transmits the ownership vectors, or at least a portion of the ownership vectors, and including at least the first ownership vector, to the remote server 808 for storage and reference. Moreover, during use, the database server 806 detects changes to an object, the ownership vector, and/or to the overall system security model that affect the association between the object and its ownership vector. When the database server 806 detects such a change, the association between the object and its ownership vector (i.e., the first ownership vector) is broken or marked invalid. In some embodiments, the database server 806 repeatedly, such as periodically, executes a script that determines whether any object is not associated with an ownership vector, such as for a new object or for an object whose association with an ownership vector was broken. When a new object exists or an object exists without an associated ownership vector, the database server 806 assigns an ownership vector, such as a second ownership vector, to the object based on one or more of the object's security attributes or properties. The database server 806 then re-publishes or transmits the ownership vectors, or at least a portion of the ownership vectors, and including at least the second ownership vector, to the remote server 808 or client system 810. Notably, the first and second ownership vectors may be the same based on the security attributes or other properties of the object. For example, the first and second ownership vectors may be aligned with overlapping security attributes as designed by the system administrator. However, it should be noted that the first and second ownership vectors may also be different based on the security attributes or other properties of the object.

Furthermore, the database server 806 may receive a query from the remote server 808, wherein the query includes ownership vector criteria. For example, the client system 810 may generate a query based on user inputs, and transmit the query to the remote server 808 for execution via the database server 806. The remote server 808 joins the ownership vector data into the query before the query is sent to the database server 806. The database server 806 performs a search of the relational database using the joined query and returns or transmits the results to the remote server 808 and/or the client system 810 for display at the client system 810 or for further processing by the remote server 808 or the client system 810. In other embodiments, the remote server 808 itself performs the search using the joined query. In such embodiments, such as when the remote server 808 is a full-text server, the remote server 808 has stored a copy of the ownership vectors and object references to the ownership vectors (i.e., references to the objects that are associated with each ownership vector). Accordingly, in such embodiments, the remote server 808 performs the query without the database server 806.

Figure 9:
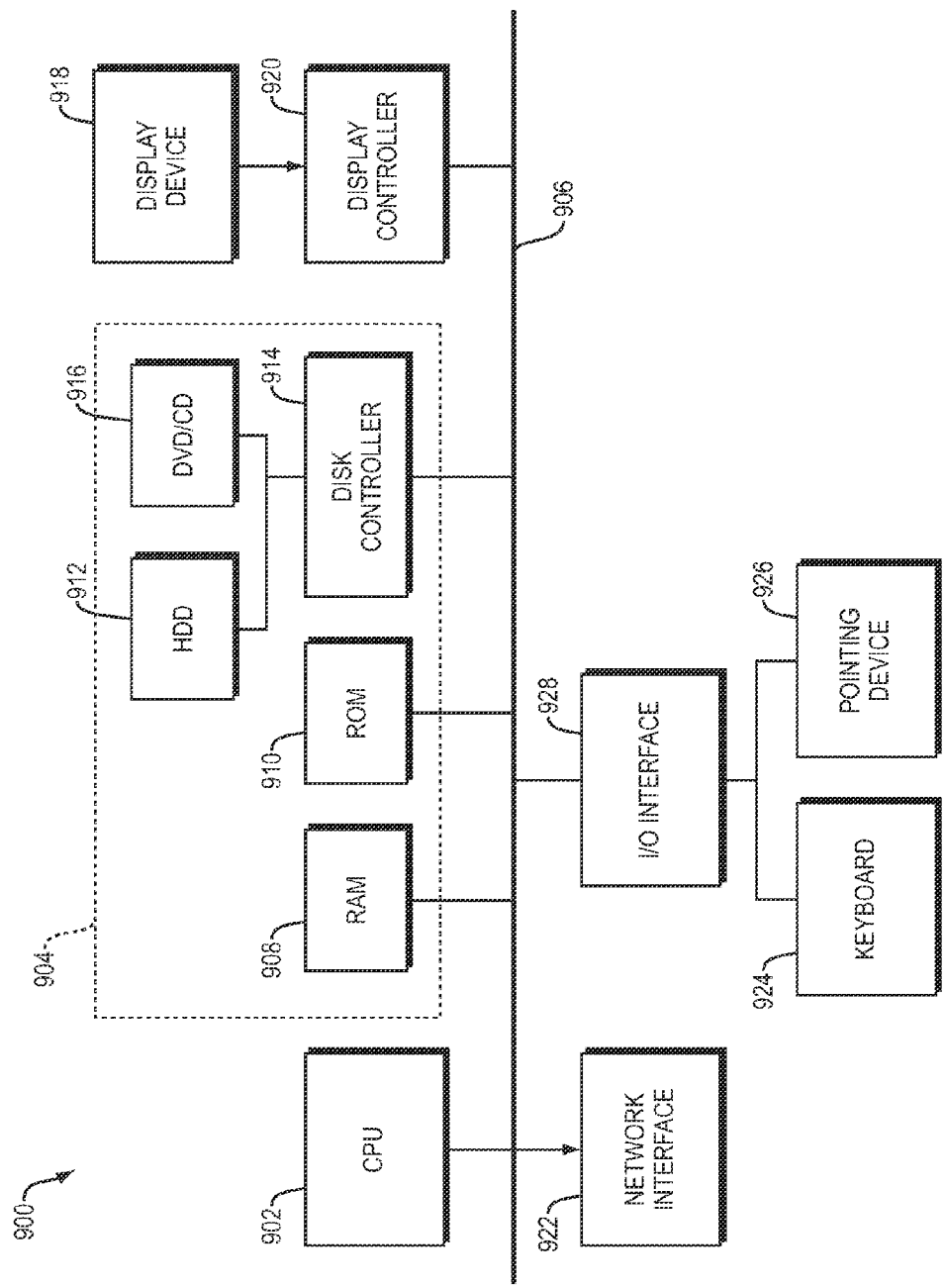
FIG. 9 is a schematic block diagram of an exemplary computer architecture for use with the database server (shown in FIG. 8).

FIG. 9 is a schematic block diagram of an exemplary computer architecture 900 for use with the database server 806 (shown in FIG. 8). In some embodiments, and as described above, servers 806 and 808 (also shown in FIG. 8) may be integrated into a single device. In such embodiments, the integrated device may be designed with a substantially similar computer architecture 900 as that shown in FIG. 9.

In an exemplary embodiment, the computer architecture 900 includes one or more processors 902 (CPU) that performs the processes described above and/or any additional processes that may be related to those described above. It should be understood that the term "processor" refers generally to any programmable system including systems and microcontrollers, reduced instruction set circuits (RISC), application-specific integrated circuits (ASIC), programmable logic circuits, and/or any other circuit or processor capable of executing the functions described herein. The above examples are exemplary only and, thus, are not intended to limit in any way the definition and/or meaning of the term "processor."

The steps of the processes described above and/or any additional processes that may be related to those described above may be stored as computer-executable instructions in, for example, a memory area 904 that is operably and/or communicatively coupled to the processor 902 by a system bus 906. A "memory area," as used herein, refers generally to any means of storing program code and instructions executable by one or more processors to aid in maintaining current database object values and/or paths. The memory area 904 may include one, or more than one, forms of memory. For example, the memory area 904 may include random-access memory (RAM) 908, which can include non-volatile RAM, magnetic RAM, ferroelectric RAM, and/or other forms of RAM. The memory area 904 may also include read-only memory (ROM) 910 and/or flash memory and/or electrically-programmable read-only memory (EEPROM). Any other suitable magnetic, optical, and/or semiconductor memory, such as a hard-disk drive (HDD) 912, by itself or in combination with other forms of memory, may be included in the memory area 904. The HDD 912 may also be coupled to a disk controller 914 for use in transmitting and receiving messages to and from the processor 902. Moreover, the memory area 904 may also be, or may include, a detachable or removable memory 916, such as a suitable cartridge disk, CD-ROM, DVD, or USB memory. The above examples are exemplary only and, thus, are not intended to limit in any way the definition and/or meaning of the term "memory area."

Furthermore, in some embodiments, the memory area 904 includes a relational database. As used herein, the term "database" refers generally to any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The computer architecture 900 also includes a display device 918 that is coupled, such as operatively coupled, to a display controller 920. The display controller 920 receives data via the system bus 906 for display by the display device 918. The display device 918 may be, without limitation, a monitor, a television display, a plasma display, a liquid crystal display (LCD), a display based on light-emitting diodes (LED), a display based on organic LEDs (OLED), a display based on polymer LEDs, a display based on surface-conduction electron emitters, a display including a projected and/or reflected image, or any other suitable electronic device or display mechanism. Moreover, the display device 918 may include a touchscreen with an associated touchscreen controller. The above examples are exemplary only and, thus, are not intended to limit in any way the definition and/or meaning of the term "display device."

In addition, the computer architecture 900 includes a network interface 922 for use in communicating with a network (not shown in FIG. 9). Moreover, the computer architecture 900 includes one or more input devices, such as a keyboard 924 and/or a pointing device 926, such as a roller ball, mouse, touchpad, and the like. The input devices are coupled to and controlled by an input/output (I/O) interface 928, which is further coupled to the system bus 906.

A description of the general features and functionality of the display device 918, keyboard 924, pointing device 926, as well as the display controller 920, disk controller 914, network interface 922, and I/O interface 928 is omitted herein for brevity as these features are known.

During operation, the computer system 800 performs the steps shown in FIGS. 1 and 2, both described above. For example, and with reference to FIG. 1, the processor 902 creates an ownership vector for each unique combination of security attributes in the relational database. The processor 902 then assigns an ownership vector, such as a first ownership vector, to each object based on one or more of the object's security attributes or properties. The processor 902 publishes or transmits the ownership vectors, or at least a portion of the ownership vectors, and including at least the first ownership vector, to a remote server for storage and reference. Moreover, during use, the processor 902 detects changes to an object, the ownership vector, and/or to the overall system security model that affect the association between the object and its ownership vector. When the processor 902 detects such a change, the association between the object and its ownership vector (i.e., the first ownership vector) is broken or marked invalid. In some embodiments, the processor 902 repeatedly, such as periodically, executes a script that determines whether any object is not associated with an ownership vector, such as for a new object or for an object whose association with an ownership vector was broken. When a new object exists or an object exists without an associated ownership vector, the processor 902 assigns an ownership vector, such as a second ownership vector, to the object based on one or more of the object's security attributes or properties. The processor 902 then re-publishes or transmits the ownership vectors, or at least a portion of the ownership vectors, and including at least the second ownership vector, to the remote server. Notably, the first and second ownership vectors may be the same based on the security attributes or other properties of the object. For example, the first and second ownership vectors may be aligned with overlapping security attributes as designed by the system administrator. However, it should be noted that the first and second ownership vectors may also be different based on the security attributes or other properties of the object.

Furthermore, the processor 902 may receive a query from the remote server, wherein the query includes ownership vector criteria. The remote server joins the ownership vector data into the query before the query is sent to the processor 902. The processor 902 performs a search of the relational database using the joined query and returns or transmits the results to the remote server for display at a client system or for further processing by the remote server or the client system.

Exemplary embodiments of computer systems, computer devices, and computer-implemented methods or processes for use in providing security in a relational database are described above in detail. The systems, methods, and devices are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer, such as the database server or remote server described herein, includes at least one processor or processing unit and a system memory. The computer typically has at least some form of computer readable media. By way of example and not limitation, computer readable media include computer storage media and communication media. Computer storage media include non-transitory, volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present invention is described in connection with an exemplary database system environment, embodiments of the invention are operational with numerous other general purpose or special purpose database system environments or configurations. The database system environment is not intended to suggest any limitation as to the scope of use or functionality of any aspect of the invention. Moreover, the database system environment should not be interpreted as having any dependency or requirement relating to any one or combination of components illustrated in the exemplary operating environment.

Embodiments of the invention may be described in the general context of computer-executable instructions, such as non-transitory program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A computer implemented method of verifying an operator is human, the method comprising:
    selecting a pattern;
    dividing the pattern into a plurality of separate textures within a two-dimensional plane to generate textures sized to fit on a 3D element of a 3D shape;
    projecting each separate texture onto a different respective 3D element of a plurality of 3D shapes;
    randomly translating and randomly rotating at least one 3D element of the different respective 3D elements, and in response to the random translation and random rotation, translating and rotating the projected texture corresponding with the at least one 3D element within 3D space according to the randomized orientation of the respective 3D element;
    displaying, at a display device, at least a portion of the 3D elements including the at least one randomized 3D element;
    receiving operator manipulations of the randomized 3D elements to recreate the pattern, the operator manipulations including at least one of translating the 3D elements and rotating the 3D elements; and
    determining whether the operator is human if the pattern is recreated by the operator manipulated 3D elements.

2. The computer implemented method of claim 1, wherein selecting a pattern includes selecting a multimedia representation, the multimedia representation being at least one of a picture, shapes, lines, audio, video, animation, characters, and symbols.

3. The computer implemented method of claim 1, wherein projecting each texture onto a respective 3D element includes projecting each texture onto the corresponding respective 3D element, the respective 3D element including a 3D shape.

4. The computer implemented method of claim 3, wherein the 3D shape is one of a cube, a sphere, a pyramid, a box, and other 3D shape.

5. The computer implemented method of claim 1, wherein receiving operator manipulations includes receiving manipulations of the 3D elements to be located in a particular arrangement, and further includes receiving manipulations of the 3D elements in the particular arrangement to display the pattern on a collective common face of the particular arrangement.

6. The computer implemented method of claim 1, wherein projecting each texture onto the respective 3D element further includes remotely rendering a current state of the 3D elements.

7. The method of claim 6, further comprising transferring pixels of the current state of the remotely rendered 3D elements to a remote machine.

8. The computer implemented method of claim 1, wherein receiving, from the operator, manipulations of the randomized 3D elements includes receiving input from at least one of a keyboard, mouse, or other input device.

9. The computer implemented method of claim 1, wherein receiving, from the operator, manipulations of the randomized 3D elements includes receiving rotation commands from the operator to rotate the 3D element along at least one particular axis and by a particular degree and receiving translation commands from the operator to translate the 3D element in at least one particular direction.

10. The computer implemented computer implemented method of claim 9, wherein the particular axis, the particular degree, the particular directions and the particular distance are preset.

11. A computer implemented system for verifying an operator is human, the system comprising:
   a pattern selection module configured to select a pattern;
   a pattern division module configured to divide the pattern into a plurality of separate textures within a two-dimensional plane to generate textures sized to fit on a 3D element of a 3D shape;
   a projection module configured to project each separate texture onto a different respective 3D element of a plurality of 3D shapes;
   a randomization module configured to randomly translate and randomly rotate at least one 3D element of the 3D elements of the different respective 3D elements, and in response to the random translation and random rotation, translating and rotating the projected texture corresponding with the at least one 3D element within 3D space according to the randomized orientation of the respective 3D element;
   a display device configured to display at least a portion of the 3D elements including at least one randomized 3D element;
   a manipulation module configured to receive, from the operator, manipulations of the randomized 3D elements to recreate the pattern, the manipulations including at least one of translating the 3D elements and rotating the 3D elements; and
   an access module configured to determine whether the operator is human if the pattern is recreated by the operator manipulated 3D elements.

12. The computer implemented system of claim 11, wherein the pattern selection module is further configured to select a multimedia representation, the multimedia representation being at least one of a picture, shapes, lines, audio, video, animation, characters, and symbols.

13. The computer implemented system of claim 11, wherein the projection module is further configured to project each texture onto respective 3D elements, the respective 3D elements including 3D shapes.

14. The computer implemented system of claim 13, wherein the 3D shape is one of a cube, a sphere, a pyramid, a box, and other 3D shape.

15. The computer implemented system of claim 11, the manipulation module is further configured to receive manipulations of the 3D elements to be located in a particular arrangement, and to further receive manipulations of the 3D elements in the particular arrangement to display the pattern on a collective common face of the particular arrangement.

16. The computer implemented system of claim 11, wherein the projection module is further configured to remotely render a current state of the 3D elements.

17. The computer implemented system of claim 16, wherein the projection module is further configured to transfer pixels of the current state of the remotely rendered 3D elements to a remote machine.

18. The computer implemented system of claim 11, wherein the manipulation module is further configured to receive input from at least one of a keyboard, mouse, or other input device.

19. The computer implemented system of claim 11, wherein the manipulation module is further configured to receive, from the operator, manipulations to rotate the 3D element along at least one particular axis and by a particular degree and to receive, from the operator, manipulations to translate the 3D element in at least one particular direction and by a particular distance.

20. The computer implemented system of claim 19, wherein the particular axes, the particular degree, the particular directions and the particular distance are preset.

21. A non-transitory computer-readable medium configured to store instructions for verifying an operator is human, the instructions, when loaded and executed by a processor, causes the processor to:
   select a pattern;
   divide the pattern into a plurality of separate textures within a two-dimensional plane to generate textures sized to fit on a 3D element of a 3D shape, the plurality of separate textures being undistorted from the selected pattern from a two-dimensional plane perspective;
   project each separate texture onto a different respective 3D element of a plurality of 3D shapes;
   randomly translating and randomly rotating at least one 3D element of the different respective 3D elements, and in response to the random translation and random rotation, translating and rotating the projected texture corresponding with the at least one 3D element with 3D space according to the randomized orientation of the respective 3D element;
   display, at a display device, at least a portion of the 3D elements including the at least one randomized 3D element;
   allow the operator to manipulate the randomized 3D elements to recreate the pattern, the manipulations including at least one of translating the 3D elements and rotating the 3D elements; and
   determine whether the operator is human if the pattern is recreated by the operator manipulated 3D elements.

22. The computer implemented method of claim 1, wherein:

projecting each texture onto a different respective element is performed in a user interactive session displaying one or more 3D objects formed by the elements;

randomizing at least one of a position and an orientation of at least one element of the different respective elements includes randomizing at least one of a position and an orientation of at least one element of the different respective elements in the displayed one or more 3D objects of the user interface session; and determining whether the operator is human upon if the pattern is created includes determining whether the received operator manipulations recreate the displayed 3D objects in the user interface session.

23. The computer implemented method of claim 1, further comprising:

projecting a plurality of decoy textures onto a different respective portions of the 3D element, the decoy textures being textures different from textures from the pattern originally;

wherein determining whether the operator is human determines whether the pattern recreated by the operator manipulations is the selected pattern.

* * * * *